United States Patent
Whelan et al.

[11] Patent Number: 6,067,044
[45] Date of Patent: May 23, 2000

[54] REMOTE TRACKING AND SENSING SYSTEM AND METHOD

[75] Inventors: Terrence William Whelan; Amir Hossein Matini Kashani, both of Colorado Springs, Colo.

[73] Assignee: National Systems and Research Company

[21] Appl. No.: 09/157,475

[22] Filed: Sep. 21, 1998

[51] Int. Cl.[7] ............................. G01S 5/02; H04B 7/185

[52] U.S. Cl. ........................ 342/357.07; 342/357.06; 342/456

[58] Field of Search ............... 342/357.06, 357.07, 342/456; 701/117, 213

[56] References Cited

U.S. PATENT DOCUMENTS

| | | | |
|---|---|---|---|
| 5,223,844 | 6/1993 | Mansell et al. | 342/357 |
| 5,491,486 | 2/1996 | Welles et al. | 342/357 |
| 5,504,482 | 4/1996 | Schreder | 340/995 |
| 5,550,551 | 8/1996 | Alesio | 342/357 |
| 5,579,013 | 11/1996 | Hershey et al. | 342/357 |
| 5,731,757 | 3/1998 | Layson | 340/573 |

*Primary Examiner*—Thomas H. Tarcza
*Assistant Examiner*—Dao L. Phan
*Attorney, Agent, or Firm*—Dale B. Halling

[57] ABSTRACT

A remote tracking and sensing device (20) includes a global positioning system receiver (22). A processor (24) receives a position signal from the global positioning system receiver (22). A communication interface (30) connects the processor (24) to at least two wireless communication systems (26, 28). A power management system (32) provides power to the processor (24) based on an output (38) from a motion sensor (40).

22 Claims, 6 Drawing Sheets

REMOTE TRACKING AND SENSING SYSTEM AND METHOD

FIELD OF THE INVENTION

The present invention relates generally to the field of positioning systems and more particularly to a remote tracking and sensing system and method.

BACKGROUND OF THE INVENTION

The ability to track high value assets would greatly increase the efficiency of companies involved in using and transporting high value assets. In addition, the ability to track high value assets would significantly reduce the loss of high value assets. The global positioning system and other satellite positioning systems have provided the promise of tracking high value assets. Unfortunately, a number of practical problems have limited the ability to track high value assets. For instance, one type of high value asset requiring tracking is heavy construction equipment. One problem in tracking heavy construction equipment is the drain any tracking system places on the equipment's battery. Commonly, these types of equipment require the battery to be at least 80% charged in order to start the equipment. Tracking system can seriously reduce the amount of battery power when the equipment is not running for an extended period of time. Another problem has been communicating the position information to a user. Construction equipment is often used in areas not served by cellular systems or by any other wireless system having modest power requirements.

Another high value asset requiring tracking is trains. The present tracking system for trains uses fixed locations to read a bar code on the train as the train passes the fixed location. Unfortunately, a train can stop for extended periods between these fixed locations. This leaves the system with little information about the train and leaves open the possibility that a fixed location failed to read the train as it passed.

Thus there exists a need for a system that can track high value assets, without draining the equipment's battery and can transmit the position information reliably anywhere.

DETAILED DESCRIPTION OF THE DRAWINGS

The present invention combines; a global positioning system (GPS) receiver, a processor and a communication interface to track high value assets. The GPS receiver provides information on the position of the high value asset. In one embodiment the GPS receiver only determines the position (position signal), when a motion sensor indicates that the high value asset is moving. In another embodiment, the processor includes a virtual fence routine. The processor, using the position signal from the GPS receiver, determines if the high value asset has moved outside the virtual fence. When the high value asset is outside the virtual fence the processor sends a position message to the communication interface. In another embodiment, the virtual fence defines an area that the high value asset is not allowed to enter. In this case, when the high value asset enters the virtual fence (restricted area) the processor sends a position/alert message to the communication interface. The communication interface is connected to at least two wireless communication systems. This system reduces the power consumption requirements by only determining the position of the high value asset when it is moved. In addition, the system has at least two wireless communication system options. This significantly reduces the areas where no coverage can be obtained.

Figure 1:
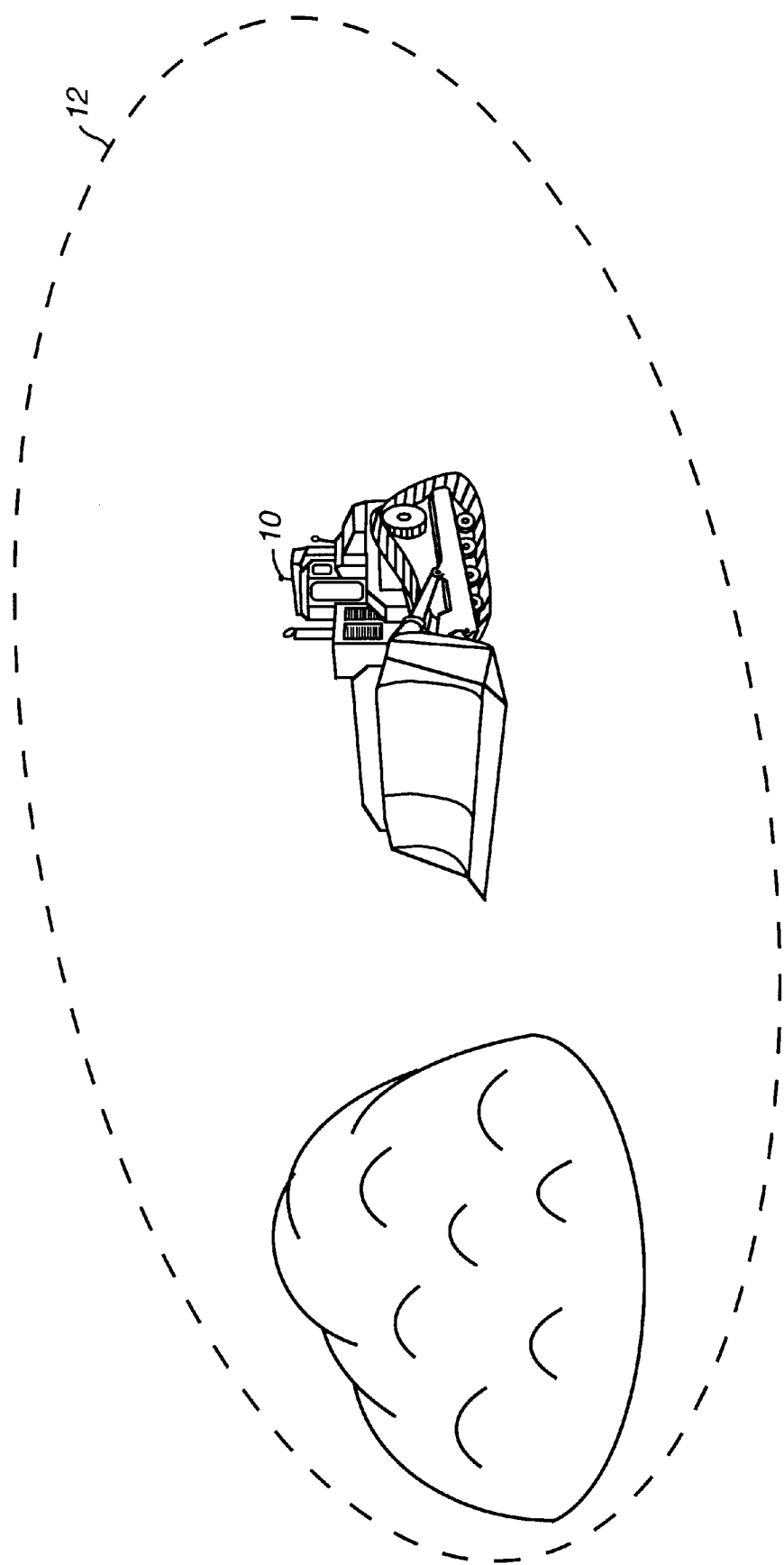
FIG. 1 is a cartoon drawing of a heavy construction equipment capable of using the invention in accordance with one embodiment of the invention.

FIG. 1 is a cartoon drawing of a heavy construction equipment 10 capable of using the invention in accordance with one embodiment of the invention. When the bulldozer 10 is equipped with the invention, a virtual fence 12 may be constructed around the bulldozer 10. In one embodiment, a virtual fence boundary is defined as a distance from a center point. For instance, the virtual fence boundary might be defined a one kilometer square around the position of the bulldozer. The invention builds a virtual fence around the bulldozer whenever the bulldozer is turned off. When the bulldozer is turned on or the invention senses motion, the invention determines the time from the GPS signals. When the time is outside of "normal working hours", then the invention determines if the position determined from the GPS signals is outside the virtual fence. If the position is outside the virtual fence, then a position signal (including an alert signal) is sent out over a communication system. When the time is within the "normal working hours", then the virtual fence is taken down. Note that the virtual fence is created by the invention on the bulldozer in this example and not determined remotely.

In another embodiment, the virtual fence boundary is a set of latitude and longitude lines. The invention constantly monitors the position, when the bulldozer is on or motion is sensed by the invention. When the position is outside of the virtual fence boundary, then the invention sends the position signal over a communication system.

Figure 2:
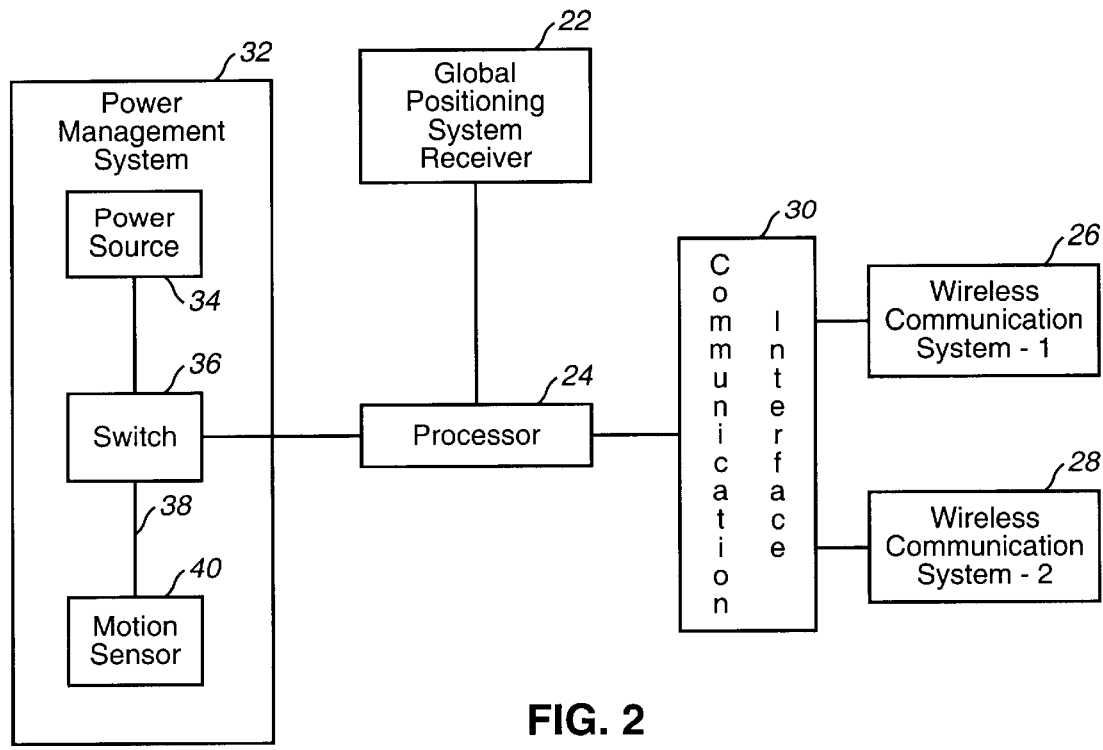
FIG. 2 is a block diagram of a tracking and sensing system in accordance with one embodiment of the invention.

FIG. 2 is a block diagram of a tracking and sensing system 20 in accordance with one embodiment of the invention. A global positioning system receiver 22 sends a position signal and a time signal to a processor 24. The GPS receiver determines both the position and time from the GPS satellite signals. The processor 24 is connected to at least two wireless communication systems 26, 28 through a communication interface 30. A power management system 32 provides power to the processor 24. The power management system 32 is designed to reduce the amount of power consumed by the tracking and sensing system 20. A power source 34 is connected to a switch 36. The switch 36 is controlled by an output 38 of a motion sensor 40. As a result, the processor 24 and the rest of the tracking system 20 receive power when the motion sensor 40 indicates motion. This significantly reduces the power consumption of the tracking system 20. In one embodiment the motion sensor is a vibration sensor. In another embodiment, the motion sensor is an accelerometer.

The at least two wireless communication systems 26, 28 allows the system 20 to select the second communication system, when the first communication system is unable to transmit a position message. This significantly increases the areas where the tracking system 20 may be used and significantly increases the usefulness of the invention. Note that more than two communication systems may be used. In one embodiment, one of the wireless communication systems is a satellite communication system. In another embodiment, the system 20 includes a sensor interface connected to the processor 24. The sensor interface receives a sensor information from a sensor, such as revolutions per minute from a tachometer. The processor transmits the sensor information using the satellite communication system.

In another embodiment the processor 24 includes a virtual fence routine. The virtual fence routine defines a boundary by a time and a location boundary. For instance, the time that the fence may be active is between 6:00 PM and 6:00 AM. If the fence is activated during this period, the location boundary might be a one kilometer square around an initial position. Note that, in one embodiment, the actual fence will be defined in terms of latitude and longitude and therefor will not be an exact square, rectangle or other polygon.

Figure 3:
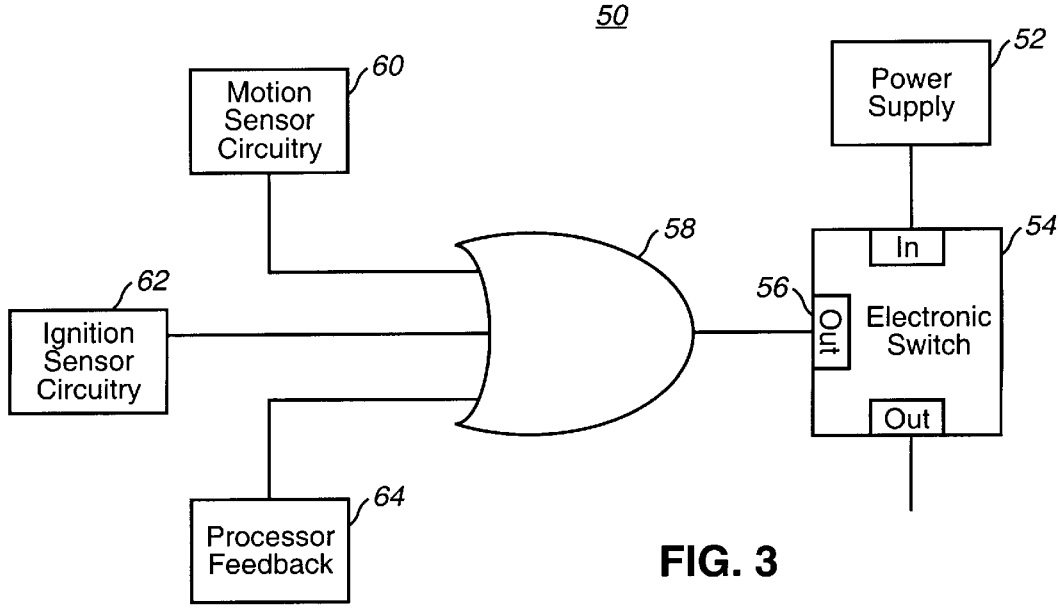
FIG. 3 is a schematic diagram of a power management system in accordance with one embodiment of the invention.

FIG. 3 is a schematic diagram of a power management system 50 in accordance with one embodiment of the invention. A power supply 52 (e.g., a vehicle's battery) is connected to an input of an electronic switch 54. A control input 56 of the electronic switch 54 is connected to the output of an OR gate 58. The three inputs to the OR gate 58 are a motion sensor circuitry 60, an ignition sensor circuitry 62 and a processor feedback line 64. When the motion sensor 60 detects motion it pulls the OR gate 58 high, causing the electronic switch to connect the power supply 52 to the tracking and sensing system. When the ignition sensor 62 detects that the ignition system is on it pulls the OR gate 58 high, causing the electronic switch to connect the power supply 52 to the tracking and sensing system. The processor feedback line 64 allows the processor to control the power for orderly shutdown and in the case where the tracking system detects a virtual fence has been breached. Once a virtual fence is breached the system sends out position messages continuously until a central system directs the tracking system to cease sending the position messages. The position message includes a latitude and longitude, alert and addition information such as time, velocity and sensor values.

Figure 4:
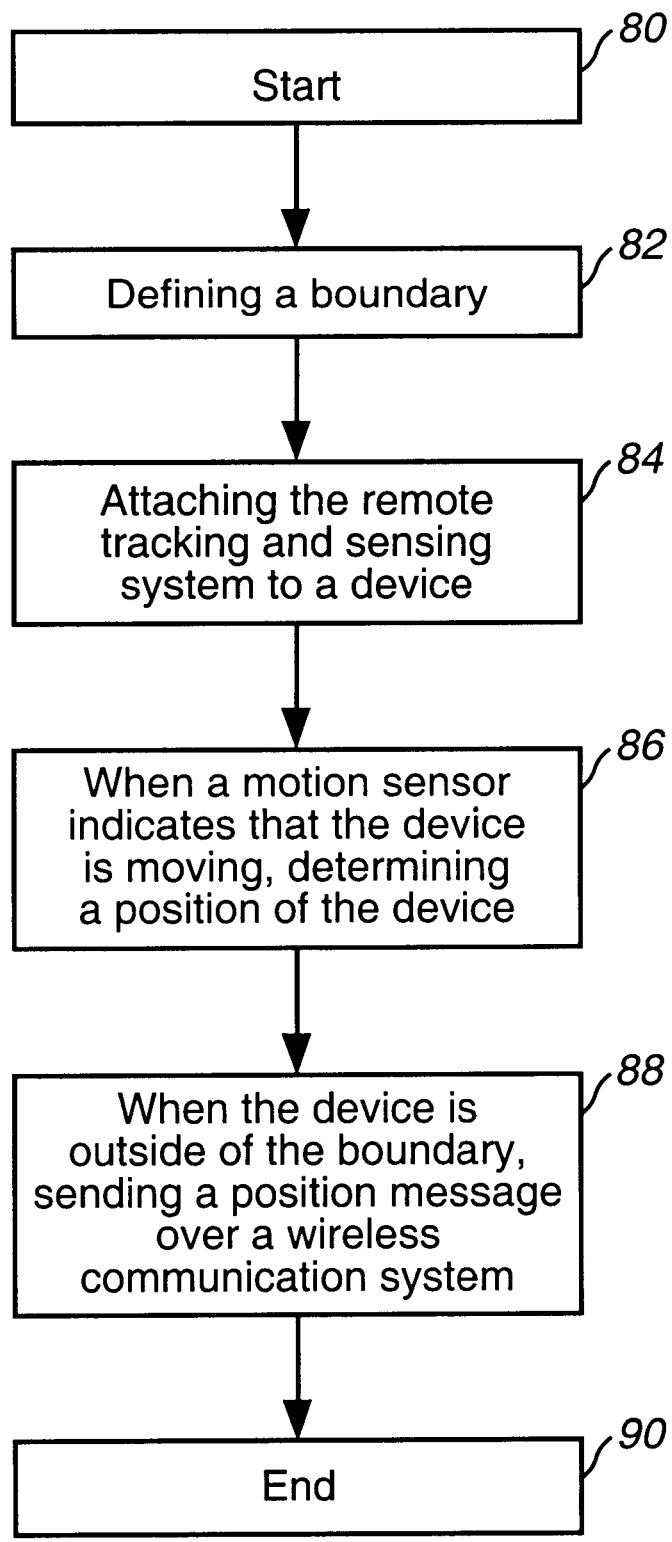
FIG. 4 is a flow chart of the steps used by a tracking and sensing system in accordance with one embodiment of the invention.

FIG. 4 is a flow chart of the steps used by a tracking and sensing system in accordance with one embodiment of the invention. The process starts, step 80, by defining a boundary at step 82. The remote tracking and sensing system is attached to a device at step 84. When a motion sensor indicates that the device is moving, a position of the device is determined at step 86. When the device is outside the boundary at step 88, a position message is sent over a wireless communication system which ends the process at step 90.

In one embodiment, before the position message is sent, a signal strength for the wireless communication system is determined. The signal strength is measured by a receiving station and this information is returned to the tracking system. When the signal strength is less than a predetermined signal strength (e.g., 3 dB), the tracking system switches to a second wireless communication system and sends the position message. In another embodiment, other indicators may be used to determine that a wireless communication system is unavailable. For instances, messages in form a receiving station may indicate that the user is not allowed access to the communication system.

In another embodiment, the boundary is defined as a maximum distance from an initial position that the device can travel. In addition, a is defined during which the boundary is active. As a result the device sets a boundary around where ever it is left at the end of the day.

In another embodiment, an ignition sensor is attached to the ignition system of the device. When the ignition sensor indicates that the ignition system is on, the position of the device is determined.

Figure 5:
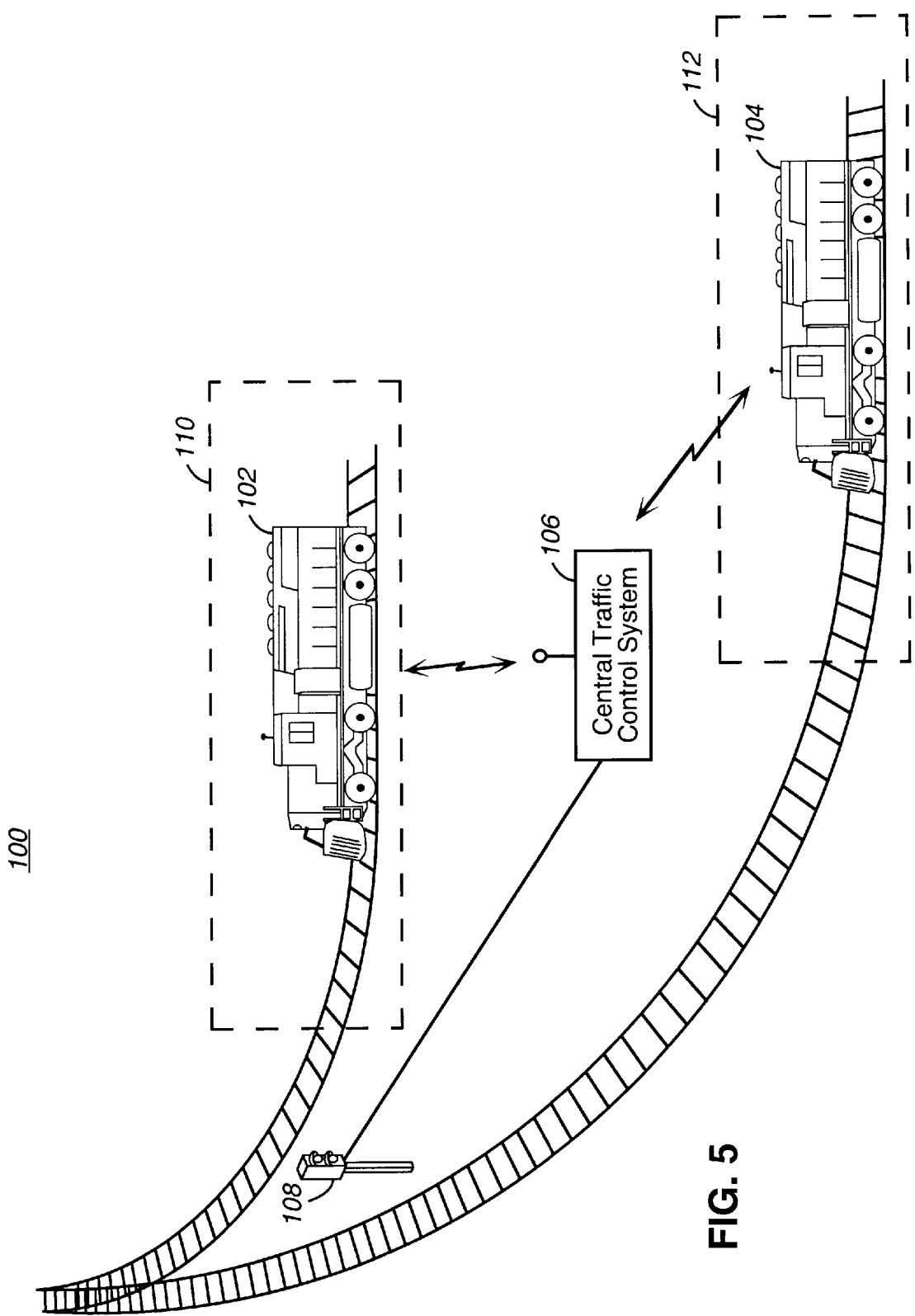
FIG. 5 is a cartoon drawing of a train system capable of using the invention in accordance with one embodiment of the invention.

FIG. 5 is a cartoon drawing of a train system 100 capable of using the invention in accordance with one embodiment of the invention. A pair of trains 102, 104 are shown in communication with a central traffic control system 106. The central traffic control system 106 is connected to a traffic control signal system 108. Each of the pair of trains has a block 110, 112 that is determined based on the position of the train 102, 104. These moving blocks are then used by the central traffic control system 106 to adjust the traffic control signal system 108 or result in traffic control signals sent directly to the trains.

Figure 6:
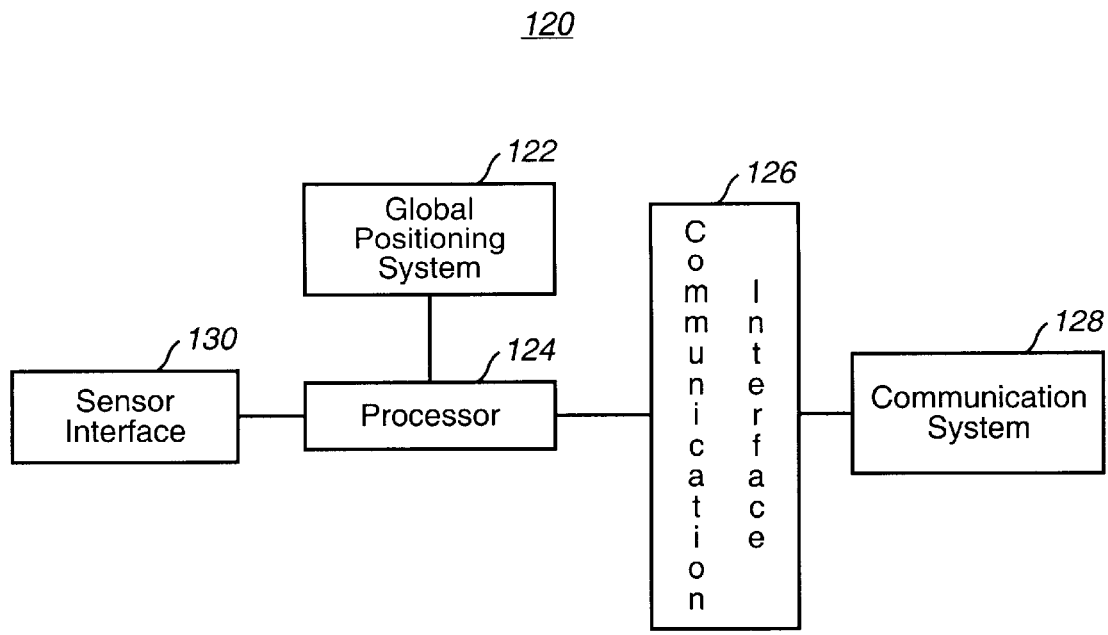
FIG. 6 is a block diagram of a tracking and sensing system in accordance with one embodiment of the invention.

FIG. 6 is a block diagram of a tracking and sensing system 120 in accordance with one embodiment of the invention. A global positioning system (GPS) receiver 122 sends a position signal to a processor 124. The processor determines a block based on the position signal and a vehicle information. The vehicle information can include but is not limited to the size and weight of the vehicle, or the type of cargo the vehicle is carrying. A communication interface 126 links the processor 124 to a communication system 128. A sensor interface 130 connects the processor 124 to a sensor. A number of different types of sensors can be connected to the sensor interface 130, such as speedometers, temperature sensors, pressure sensors, etc. This sensor data may then be sent over the communication system 128 to a central traffic control system. The central traffic control system also receives the block.

In one embodiment the position signal is sent periodically to the processor and the block is updated each time the position signal is sent. The block is a zone defined around a train, for example, that is used for traffic control purposes. The central control system monitors a plurality of blocks from a plurality of vehicles. The central control system transmits a traffic control information when one of the plurality of vehicles exceeds a vehicle dynamic parameter. For instance, a gate at a railroad crossing may not be working and a train's block is within a predetermined distance of the gate. The central system may send a signal for the train to stop or slow down. Another example is when two trains are using the same set of tracks. One of the trains may be ordered to stop at a side rail, when its block approaches the side rail.

Figure 7:
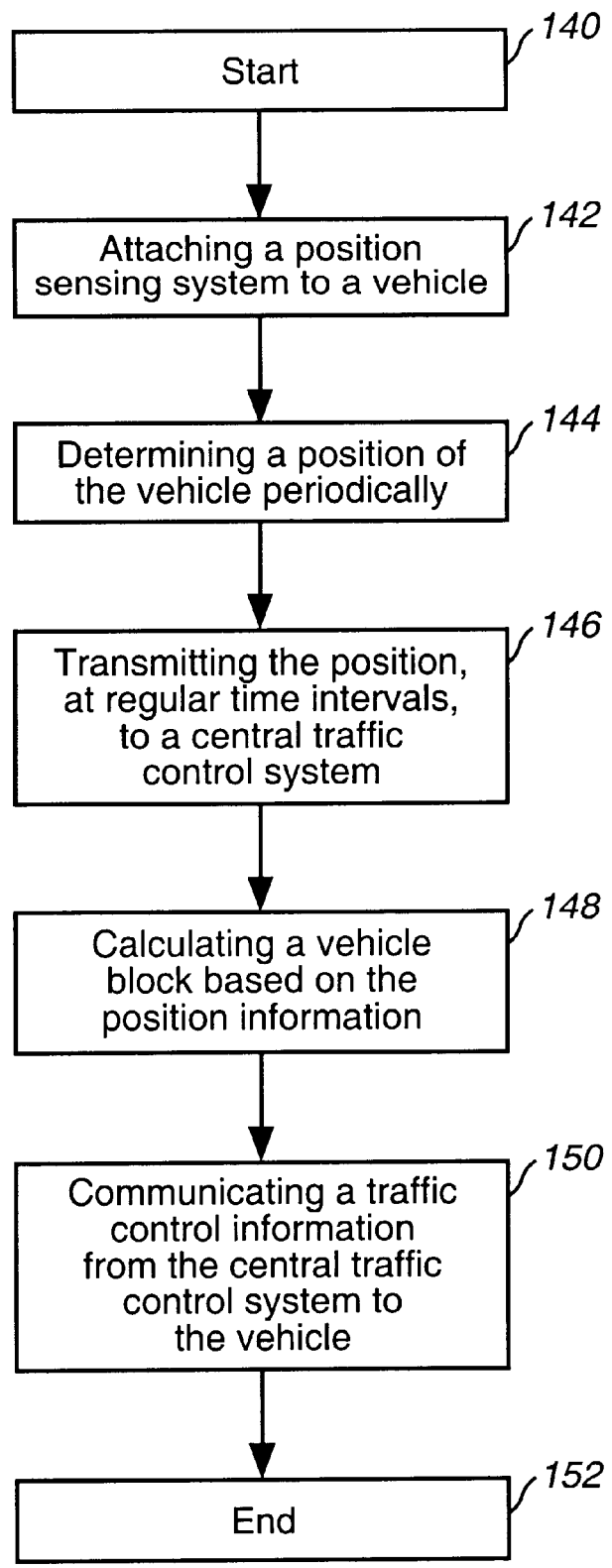
FIG. 7 is a flow chart of the steps used by a tracking and sensing system in accordance with one embodiment of the invention.

FIG. 7 is a flow chart of the steps used by a tracking and sensing system in accordance with one embodiment of the invention. The process starts, step 140, by attaching a position sensing system to a vehicle at step 142. The position of the vehicle is determined periodically at step 144. The position is transmitted to a central traffic control system at regular intervals at step 146. A vehicle block is calculated based on the position information at step 148. At step 150, the traffic control information from the central traffic control system is communicated to the vehicle which ends the process at step 152. In another embodiment the traffic control information is transmitted to a traffic control signal system.

Note that while the invention has been described with the high value asset inside the virtual fence, the fence can be an exclusionary area. In this case the high value asset cannot enter the fenced off area. When the high value asset enters the fenced off area, the system sends out an alert.

Using the system described above power is saved so that a vehicle's battery is not drained. The system also provides, in one embodiment, multiple communication paths to overcome the problem of dead spots. In addition, the system allows moving blocks that provide block information on a regular basis.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A remote tracking and sensing device, comprising:

a global positioning system receiver;

a processor receiving a position signal from the global positioning system receiver;

a communication interface connecting the processor to at least two wireless communication systems, the at least two wireless communication systems designed to transmit the position signal; and a power management system providing power to the processor based on an output from a motion sensor.

2. The remote tracking and sensing system of claim 1, wherein the motion sensor is a vibration sensor.

3. The remote tracking and sensing system of claim 1, wherein the motion sensor is an accelerometer.

4. The remote tracking and sensing system of claim 1, wherein the power management system includes an electronic switch that is controlled by an ignition sensor.

5. The remote tracking and sensing system of claim 1, wherein the processor selects a second of the at least two wireless communication systems, when the first of the at least two wireless communication systems is unable to transmit a message.

6. The remote tracking and sensing system of claim 5, wherein one of the at least two wireless communication systems is a satellite communication system.

7. The remote tracking and sensing system of claim 6, further including a sensor interface connected to the processor, the sensor interface receiving a sensor information and transmitting the sensor information over the satellite communication system.

8. The remote tracking and sensing system of claim 1, wherein the processor includes a virtual fence routine.

9. The remote tracking and sensing system of claim 8, wherein the virtual fence routine defines a boundary by a time and a location boundary.

10. The remote tracking and sensing system of claim 9, wherein the processor sends a position message over one of the at least two wireless communication when the remote tracking and sensing system breaks the boundary.

11. A method of operating a remote tracking and sensing system, comprising the steps of:

(a) attaching the remote tracking and sensing system to a device;

(b) determining a boundary when a device is turned off;

(c) when a motion sensor indicates that the device is moving, determining a position of the device; and (d) when the device is outside of the boundary, sending a position message over a wireless communication system.

12. The method of claim 11, wherein step (d) further includes the step of:

(d1) determining a received signal strength for the wireless communication system;

(d2) when the received signal strength is less than a predetermined signal strength, switching to a second wireless communication system and sending the position message.

13. The method of claim 11, wherein step (b) includes the steps of:

(b1) defining a maximum distance from an initial position the device can travel;

(b2) defining a time period during which the boundary is active.

14. The method of claim 11, wherein step (a) further includes the step of attaching an ignition sensor to an ignition system of the device.

15. The method of claim 14, wherein step (c) further includes the step of:

(c1) when the ignition sensor indicates that the ignition system is on, determining a position of the device.

16. A tracking and traffic control system, comprising:

a global positioning system receiver;

a processor receiving a position signal from the global positioning system receiver, the processor determining a block based on the position signal and a vehicle information, wherein the position signal is sent periodically and the block is updated each time the position signal is determined;

a communication interface linking the processor to a communication system; and a central control system receiving the block over the communication system.

17. The tracking and traffic control system of claim 16, wherein the central control system monitors a plurality of blocks from a plurality of vehicles.

18. The tracking and traffic control system of claim 17, wherein the central control system transmits a traffic control information when one of the plurality of vehicles exceeds a vehicle dynamic parameter specification.

19. The tracking and traffic control system of claim 18, wherein the traffic control information is sent to a traffic control signal system.

20. A method of operating a tracking and traffic control system, comprising the steps of:

(a) attaching a position sensing system to a vehicle;

(b) determining a position of the vehicle periodically;

(c) transmitting the position, at regular time intervals, to a central traffic control system;

(d) calculating a vehicle block based on the position information; and (e) communicating a traffic control information from the central traffic control system to the vehicle.

21. The method of claim 20, wherein step (e) includes the step of:

(e1) transmitting the traffic control information to a traffic control signal system.

22. The method of claim 20, wherein the step of determining the position includes the step of using a global positioning system receiver to determine the position.

* * * * *